United States Patent
Daniels et al.

(10) Patent No.: US 11,542,042 B2
(45) Date of Patent: Jan. 3, 2023

(54) MICRO-CATHODE MATRIX ARC THRUSTERS

(71) Applicant: The George Washington University, Washington, DC (US)

(72) Inventors: Keir Daniels, New York, NY (US); Zachary Switzer, Washington, DC (US); Dimitris Kiaoulias, Washington, DC (US); Michael Keidar, Baltimore, MD (US)

(73) Assignee: The George Washington University, Washington, DC (US)

( * ) Notice: Subject to any disclaimer, the term of this patent is extended or adjusted under 35 U.S.C. 154(b) by 43 days.

(21) Appl. No.: 17/021,019

(22) Filed: Sep. 15, 2020

(65) Prior Publication Data

US 2021/0078734 A1 Mar. 18, 2021

Related U.S. Application Data

(60) Provisional application No. 62/901,009, filed on Sep. 16, 2019.

(51) Int. Cl.
*B64G 1/40* (2006.01)
*B64G 1/42* (2006.01)
*B64G 1/10* (2006.01)

(52) U.S. Cl.
CPC .............. *B64G 1/405* (2013.01); *B64G 1/425* (2013.01); *B64G 1/105* (2013.01)

(58) Field of Classification Search
CPC ....... F03H 1/0081–0093; F03H 1/0012; B64G 1/425; B64G 1/405
See application file for complete search history.

(56) References Cited

U.S. PATENT DOCUMENTS

| | | | |
|---|---|---|---|
| 7,516,610 B2 | 4/2009 | Gilchrist et al. |
| 9,517,847 B2 | 12/2016 | Keidar et al. |
| 10,107,271 B2 | 10/2018 | Keidar et al. |
| 2009/0056305 A1 | 3/2009 | Gilchrist et al. |
| 2011/0258981 A1 | 10/2011 | Keidar et al. |
| 2015/0052874 A1 | 2/2015 | Keidar et al. |
| 2016/0273524 A1 | 9/2016 | Keidar et al. |

(Continued)

OTHER PUBLICATIONS

D. B. Zolotukhin, et al., "Optimization of Discharge Triggering in Micro-Cathode Vacuum Arc Thruster for CubeSats", Plasma Sources Science and Technology, vol. 27, 2018, 10 pgs.

*Primary Examiner* — Arun Goyal
*Assistant Examiner* — William L Breazeal
(74) *Attorney, Agent, or Firm* — Blank Rome LLP

(57) ABSTRACT

A matrix thruster that may be used to reposition and/or stabilize a CubeSAT satellite. The matrix thruster includes a conductive plate with an opening, a plurality of wires within the opening, a power supply electrically connected to the conductive plate or each of the plurality of wires via an inductor, and an electrical switch. The electrical switch creates a current change that creates an electric potential spike across the inductor. The electric potential spike across the inductor initiates an arc discharge between one of the wires and the conductive plate, which forms plasma that ejects cathode particles from the matrix thruster. Using multiple wires (e.g., four titanium wires) extends the lifetime of the thruster, as each wire restores an inter-electrode film needed for the other wires to continue generating plasma.

18 Claims, 3 Drawing Sheets

(56) References Cited

U.S. PATENT DOCUMENTS

2017/0370353 A1 12/2017 Keidar et al.
2018/0244406 A1* 8/2018 Neumann ............. F03H 1/0087
2018/0370659 A1 12/2018 Keidar et al.

* cited by examiner

MICRO-CATHODE MATRIX ARC THRUSTERS

CROSS-REFERENCE TO RELATED APPLICATIONS

This application claims priority to U.S. Prov. Pat. Appl. No. 62/901,009, filed Sep. 16, 2019, which is hereby incorporated by reference.

FEDERAL FUNDING

This invention was made with government support awarded by the Air Force Office of Scientific Research (grant FA9550-19-1-0166), the NASA DC Space Grant Consortium, and the National Science Foundation (grant 1747760).

BACKGROUND

In an effort to reduce cost and improve mission redundancy, the space community is designing small satellites for a variety of missions. A challenge for these satellites is that their low volume and power restrictions limit options to fit them with propulsion systems. To address this challenge, micro-cathode arc thrusters (µCATs) have been developed for CubeSats. µCATs are vacuum arc plasma thrusters designed to have a central cathode and an outer anode in a coaxial configuration.

FIG. 1 illustrates a prior art thruster 100.

As shown in FIG. 1, the thruster 100 includes a cathode 160, an anode 180, and an insulator 102 that provides structure for the plasma thruster 100. A material, such as carbon paint, is deposited. Current flowing between the cathode 160 and the anode 180 causes the carbon paint to evaporate and provide initial particles 166 in vacuum, which cause breakdown and the formation of a cathode spot 165. Some of the cathode particles 166 fall along the thruster face and form an inter-electrode film 190 along a surface of the insulator 102 between the cathode 160 and the anode 180. All parts of the plasma thruster—including the cathode 160, the anode 180, the inter-electrode film 190, and even the insulator 102—degrade after each arc pulse between the cathode 160 and the anode 180. Some of the cathode particles 166 and inter-electrode film particles 198 are ejected from the plasma thruster 100, forming a cathodic jet 108 and producing thrust in the micronewton range.

Thrusters 100 are typically used for the entire lifetime of the thruster 100. Thruster death generally occurs as the result of one of two possible cases. In one case, the ablative material (i.e., the cathode particles 166 and the inter-electrode film 190) builds up on the thruster head and causes a short circuit. The second case has the opposite issue because not enough ablative material is deposited. Insufficient ablative material causes a high resistance, which is equivalent to a permanently open circuit between the anode and cathode.

In most instances, the "weak link" that causes thruster death is degradation of the inter-electrode film 190. Accordingly, there is a need for improved thrusters that replenish the inter-electrode film 190 and extend the lifetime of the thruster.

SUMMARY

A matrix thruster is provided. The matrix thruster may be used to reposition and/or stabilize a CubeSAT satellite. The matrix thruster includes a conductive plate with an opening, a plurality of wires within the opening, a power supply electrically connected to the conductive plate or each of the plurality of wires via an inductor, and an electrical switch. The electrical switch creates a current change that creates an electric potential spike across the inductor. The electric potential spike across the inductor initiates an arc discharge between one of the wires and the conductive plate, which forms plasma that ejects cathode particles from the matrix thruster. Using multiple wires (e.g., four titanium wires) extends the lifetime of the thruster, as each wire restores an inter-electrode film needed for the other wires to continue generating plasma.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
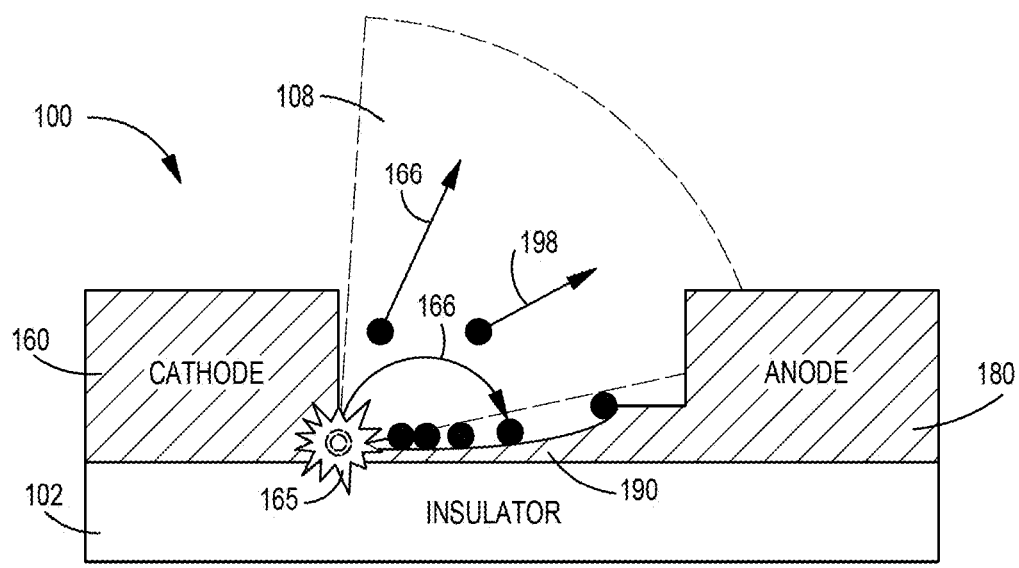
FIG. 1 illustrates a prior art thruster.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 2:
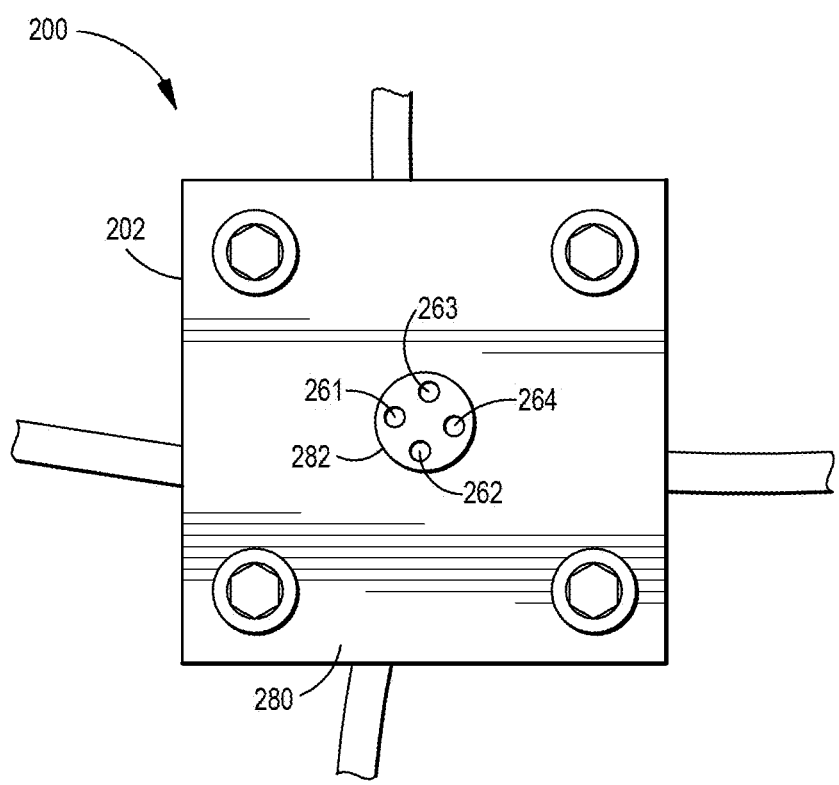
FIG. 2 illustrates a matrix thruster according to an exemplary embodiment.

FIG. 2 illustrates a matrix thruster 200 according to an exemplary embodiment.

As shown in FIG. 2, the matrix thruster 200 includes multiple wires (e.g., four wires 261-264), a conductive plate 280 with an opening 282, and a ceramic insulator 202. The wires 261-264 may be any conductive material (e.g., titanium). The conductive plate 280 may be copper. The opening 282 may be circular or any other suitable shape, such as square. A thin film of conductive paint (e.g., carbon paint) is applied to the conductive plate 280. The ceramic insulator 202 insulates the wires 261-264, acts as a support structure for the matrix thruster 200, and provides a platform for the deposit of back scattered ablated material. The ceramic insulator 202 and the conductive plate 280 can each be substantially the same size and shape, shown in the example embodiment of FIG. 2 as a square. Or they can be different shapes. The ceramic insulator 202 may be a plate on the bottom the conductive plate 280 may be placed on top of the ceramic insulator 202. The conductive plate 280 may be coupled to the ceramic insulator 202, for example by one or more metal screws.

The matrix thruster is a low weight, low current device that may be used, for example, to reposition and/or stabilize a CubeSAT satellite. As described below, the wires 261-264 may operate as cathodes while the conductive plate 280 operates as an anode. Alternatively, the wires 261-264 may operate as anodes while the conductive plate 280 operates as a cathode. Like the prior art plasma thruster 100, the cathode and the anode of the matrix thruster 200 form a cathode spot 165 and eject cathode particles 166. Some of those cathode particles 166 (along with evaporated carbon paint, particles from the anode, etc.) form an inter-electrode film 190 between the cathode and the anode. The inter-electrode film 190 facilitates additional plasma formation.

Unlike the prior art thruster 100, the matrix thruster 200 includes multiple wires (e.g., four wires 261-264) in close proximity. As each wire 261-264 generates cathode particles 166, some of those cathode particles 166 restore the inter-electrode film 190 needed for the other wires 261-264 to continue forming cathode spots 165 and generating more cathode particles 166. If one of the wires 261-264 fails to produce plasma, any of the other wires 261-264 can ignite, restore the inter-electrode film 190 in the vicinity of the first wire 261-264, and allow the first wire 261-264 to reignite and restore the plasma production of the first wire 261-264. As described below, it has been found that using multiple wires 261-264 to generate multiple plasma spots 165 increases the lifetime of the matrix thruster 200 by more than what than what a linear model would suggest. In other words, employing four wires 261-264 may increase the lifetime of the matrix thruster 200 by more than four times.

The wires 261-264 are arranged within the opening 282 of the conductive plate 280. The wires 261-264 may be flush with the opening 282 or may be set back within the matrix thruster 200. The wires 261-264 are arranged in close enough proximity to each other that each wire 261-264 regenerates the inter-electrode film 190 used by the other wires 261-264. For example, the wires 261-264 may be arranged several millimeters apart (e.g., 1-3 millimeters apart).

As shown, the insulator 202 and the conductive plate 280 may be flat and may each extend in a plane. The wires 261-264 may each have an elongated body with a longitudinal axis that extend substantially orthogonal to the plane of the conductive plate 280. The body of the wires can extend substantially parallel to one another, separated by a distance, and the body of all the wires can be contained or embedded within an insulative support sleeve that maintains the appropriate position of each wire 261-264 with respect to the other wires 261-264. The end portions of the wires 261-264 may form transverse end faces that are adjacent to or enter the opening 282. The end portions and end faces can extend outward from the insulative support sleeve. The end faces may each be flush with the top surface of the conductive plate 280, and in the same plane as the conductive plate 280. Or, one or more of the end faces can be recessed with respect to the top surface of the conductive plate 280. The cathodic jet 108 generated by the wires 261-264 and conductive plate 280 may extend substantially orthogonally outward from the plane of the top surface of the conductive plate 280. Thus, one embodiment has multiple cathodes, here shown as the cathodes (wires 261-264), in an opening to be surrounded by another electrode, here shown as the anode (conductive plate 280).

As described below, one wire 261-264 (for example the wire with the least resistive path to the conductive plate 280) may form a cathode spot 165 and cause the other wires 261-264 to ignite and form a cathode spot 165. Alternatively, the matrix thruster 200 may include circuitry (described below) that selectively generates an arc discharge between one of the wires 261-264 and the conductive plate 280.

In the embodiment shown, four wires 261-264 are utilized, and the wires 261-264 are substantially collectively centered with respect to the opening 282 to be equidistant from the conductive plate 280 about the opening 282. However, any suitable number of wires 261-264 may be used, for example two or more. And, the wires 261-264 may be positioned in any suitable pattern. The wires 261-264 need not all be equidistant from each other or to the conductive plate, but can be offset and arranged in other patterns.

The matrix thruster 200 may be realized in several embodiments, referred to herein as a passive mode matrix thruster 300, a copper mode matrix thruster 400, and a capacitive storage thruster 500.

Figure 3:
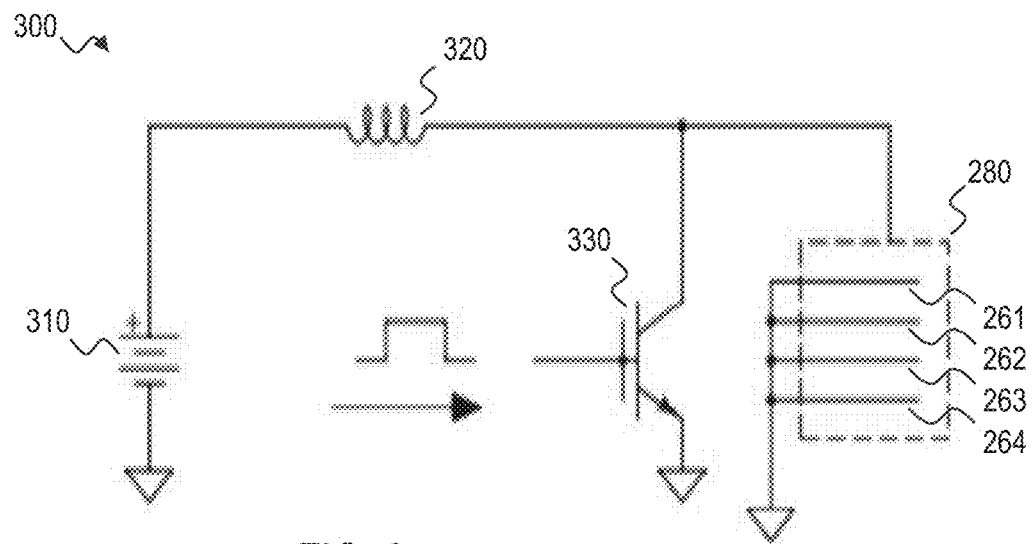
FIG. 3 is a diagram of the matrix thruster in a passive mode according to an exemplary embodiment.

FIG. 3 is a diagram of the passive mode matrix thruster 300 according to an exemplary embodiment. In the passive mode, the wires 261-264 act as a cathode and the conductive plate 280 acts as an anode.

As shown in FIG. 3, the passive mode matrix thruster 300 includes a power supply 310, an inductor 320, and an electrical switch 330. The power supply 310 may be a 20- to 25-volt battery. The inductor 320 may be a 550-microhenry inductor. The electrical switch 330 may be an insulated-gate bipolar transistor (IGBT). The wires 261-264 are connected in parallel to the power supply 310 and the inductor 320, which operate as a power processing unit (PPU). In the passive mode, a cathode spot is generated on the wire 261-264 (cathode) with the least resistance between that wire 261-264 and the conductive plate 280 (anode).

The electrical switch 330 is defaulted to open and is closed briefly to short the circuit. Most of the time, the circuit will have nearly 0 amps flowing in the circuit. Closing and the opening of the electrical switch 330, however, creates a large current change that leads to an electric potential spike across the inductor 320. The electric potential spike boosts the voltage to a level that allows an arc discharge between the cathode, in this instance one of the wires 261-264, and the anode, in this instance the conductive plate 280, of the passive mode matrix thruster 300.

The passive mode matrix thruster 300 may be controlled by a microcontroller, which outputs signals to control the electrical switch 330. The microcontroller may be programmed to operate the passive mode matrix thruster 300 at a specific discharge frequency. The microcontroller may also be programmed to close the electrical switch 330 for a predetermined IGBT short time. The discharge frequency and/or the IGBT short time may be experimentally determined to increase the thrust and/or increase the lifetime of the passive mode matrix thruster 300. The microcontroller may be programmed to adjust the IGBT short time of the electrical switch 330 over the lifetime of the passive mode matrix thruster 300 to increase the thrust and/or increase the lifetime of the passive mode matrix thruster 300.

Figure 4:
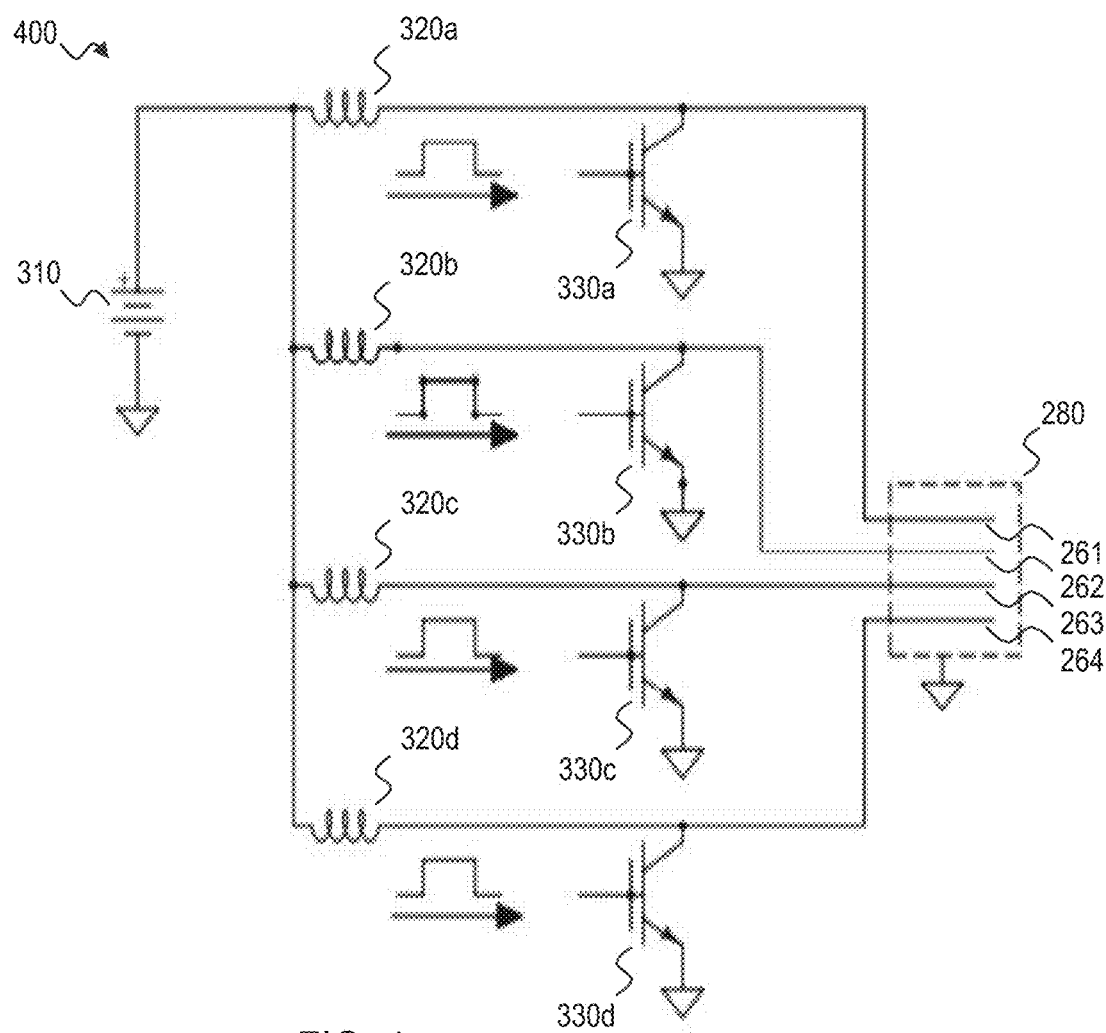
FIG. 4 is a diagram of the matrix thruster in a "copper mode" according to an exemplary embodiment.

FIG. 4 is a diagram of the copper mode matrix thruster 400 according to an exemplary embodiment. In the copper mode, the conductive plate 280 acts as a cathode and the wires 261-264 act as anodes.

As shown in FIG. 4, the copper mode matrix thruster 400 includes a power supply 310, an inductor 320 for each of the four wires 261-264 (individually referred to as inductors 320a-320d), and an electrical switch 330 for each of the four wires 261-264 (individually referred to as inductors 330a-330d). The power supply 310 may be a 20- to 25-volt battery. Each inductor 320a-320d may be a 550-microhenry inductor. Each electrical switch 330a-330d may be an insulated-gate bipolar transistor (IGBT).

The copper mode matrix thruster 400 may be controlled by a microcontroller, which outputs signals to control the electrical switches 330a-330d. The microcontroller may be programmed to operate the copper mode matrix thruster 400 at a specific discharge frequency. The microcontroller may also be programmed to close the electrical switches 330a-330d for predetermined IGBT short times. The discharge frequency and/or the IGBT short times may be experimentally determined to increase the thrust and/or increase the lifetime of the copper mode matrix thruster 400. The microcontroller may be programmed to adjust the IGBT short times of the electrical switch 330a-330d over the lifetime of the copper mode matrix thruster 400 to increase the thrust and/or increase the lifetime of the copper mode matrix thruster 400.

The copper mode matrix thruster 400 has four times the number of inductors 320a-d (and electrical switches 330) as the passive mode matrix thruster 300. By quadrupling the number of inductors 320a-d, the copper mode matrix thruster 400 is able to run each of the four wires 261-264 in parallel to generate four cathode spots, which may increase thrust levels (relative to the passive mode matrix thruster 300). Requiring four inductors 320a-320d, however, significantly increases the total mass of the copper mode matrix thruster 400 (relative to the passive mode matrix thruster 300). Accordingly, there is a need for a circuit that can generate multiple cathode spots with fewer inductors 320.

Figure 5:
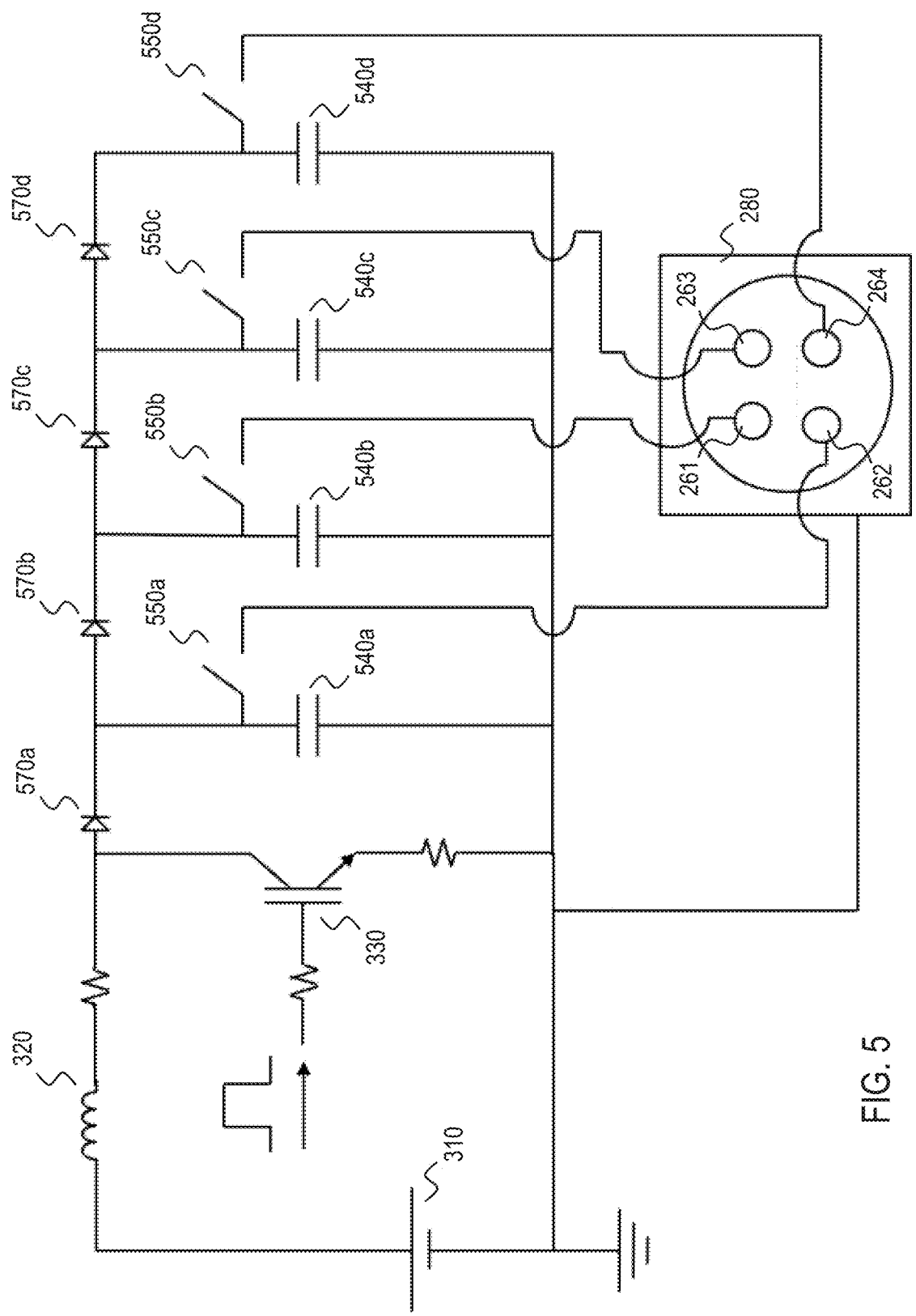
FIG. 5 is a diagram of a capacitive storage power processing unit for the matrix thruster according to an exemplary embodiment.

FIG. 5 is a diagram of the capacitive storage thruster 500 according to an exemplary embodiment. In the capacitive storage thruster 500, the conductive plate 280 acts as a cathode and the wires 261-264 act as anodes. By storing high-voltage pulses in high-voltage capacitors, the capacitive storage thruster 500 can generate four cathode spots using only a single inductor 320.

As shown in FIG. 5, the capacitive storage thruster 500 includes a power supply 310, an inductor 320, and an electrical switch 330. The power supply 310 may be a 25-volt battery. The inductor 320 may be a 550-microhenry inductor. The electrical switch 330 may be an insulated-gate bipolar transistor (IGBT). The capacitive storage thruster 500 also includes a capacitor 540 for each of the four wires 261-264 (individually referred to as capacitors 540a-540d), and a high voltage switch 550 for each of the four wires 261-264 (individually referred to as anode switches 550a-550d), and a diode 570 for each of the four wires 261-264 (individually referred to as diodes 570a-570d).

The capacitive storage thruster operates in two stages. In a first stage, a microcontroller triggers the electrical switch 330 to draw a current through the inductor 320 (similar to the passive mode matrix thruster 300) and store this energy in the form of a magnetic field. Once the microcontroller signal is removed and the electrical switch 330 switch is opened, a voltage spike of roughly 1.2 kilovolts is generated by the inductor 320 and stored in each of the four parallel capacitors 540a-540d. The approximate value of the voltage spike value may be determined using the formula shown in Eq. 1, where V is the voltage volts, L is the inductance, di is the infinitesimal change in current, and dt is the infinitesimal change in time:

$$V = L\frac{di}{dt} \quad [\text{Eq. 1}]$$

High voltage diodes 570a-570d are used to prevent the capacitors 540a-540d from back-discharging into the inductor 320 or the electrical switch 330. In a second stage, the microcontroller triggers the anode switches 550a-550d, each of which connect one of the wires 261-264 in series with one of the capacitors 540, creating four cathode spots and initiating an arc from the shared cathode (the conductive plate 280) to each of the anodes (the wires 261-264).

Experiments were conducted to measure the thrust and lifetimes of the passive mode matrix thruster 300, the copper mode matrix thruster 400, and the capacitive storage thruster 500. To test the thrust values' dependency on the firing/pulsing frequency and IGBT short times, the thruster pulsing and short times of the electrical switch 330 (or electrical switches 330a-d) were varied. The passive mode matrix thruster 300 was found to generate between 1 to 3.8 micronewtons of thrust. Increases in the pulse frequency was found to correlate with only small to moderate increases in thrust. Longer IGBT short times was found to be correlated with increased thrust. The copper mode matrix thruster 400 was found to generate 1.6 to 2 micronewtons of thrust. No significant correlation between thrust and changes to the pulsing frequency was observed. Increased thrust with larger IGBT short times, which was observed in the experimental tests of the passive mode matrix thruster 300, was not observed in the experimental tests of the copper mode matrix thruster 400. The capacitive storage thruster 500 was found to generate between 2 and 11 micronewtons of thrust.

Of the three embodiments described above, the passive mode matrix thruster 300 was found to have the longest lifetime, about 1 million pulses when the thruster was running in the passive mode with a pulse rate of 40 hertz and gradual increases to the IGBT short times and between 1.8 and 2.5 million pulses when the thruster was running in the passive mode with a pulse rate of 10 hertz and gradual increases in the IGBT short times.

Though the thruster has been shown and described as having round elongated wires 261-264, any suitable structure can be utilized with any suitable shape, such as a rod with a circular or square cross-section. Any other suitable cathode or anode device can also be utilized for the wires 261-264, and/or for the conductive plate 180.

It is noted that the drawings may illustrate, and the description and claims may use geometric or relational terms, such as top, bottom, planar, elongated, parallel, transverse, surrounded, orthogonal, square, circular, corner, longitudinal. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A matrix thruster, comprising:
a conductive plate with an opening;
a plurality of wires within the opening;
a power supply electrically connected to the conductive plate or each wire of the plurality of wires via an inductor;
an electrical switch that creates a current change, the current change creating an electric potential spike across the inductor, the electric potential spike across the inductor initiating an arc discharge between the conductive plate and one or more wires of the plurality of wires, the arc discharge forming a plasma that ejects cathode particles from the matrix thruster; and
carbon paint applied to the conductive plate, wherein the carbon paint and cathode particles facilitate an electrical breakdown that promotes plasma formation.

2. The matrix thruster of claim 1, wherein some of the cathode particles form an inter-electrode film that facilitates additional plasma formation.

3. The matrix thruster of claim 1, wherein the plurality of wires are arranged proximate each other such that the arc discharge is between the conductive plate and a first wire of the plurality of wires and generates an inter-electrode film that facilitates plasma formation at a second wire of the plurality of wires.

4. The matrix thruster of claim 3, wherein the plurality of wires comprises four wires.

5. The matrix thruster of claim 1, further comprising:
a microcontroller that controls the matrix thruster by outputting signals to the electrical switch.

6. A matrix thruster, comprising:
a conductive plate with an opening;
a plurality of wires within the opening;
a power supply electrically connected to the conductive plate or each wire of the plurality of wires via an inductor; and
an electrical switch that creates a current change, the current change creating an electric potential spike across the inductor, the electric potential spike across the inductor initiating an arc discharge between the conductive plate and one or more wires of the plurality of wires, the arc discharge forming a plasma that ejects cathode particles from the matrix thruster, wherein:
the conductive plate is electrically connected to the power supply via the inductor;
the electrical switch initiates the arc discharge between a first wire of the plurality of wires and the conductive plate; and
the arc discharge between the first wire of the plurality of wires and the conductive plate initiates another arc discharge between a second wire of the plurality of wires and the conductive plate.

7. A matrix thruster, comprising:
a conductive plate with an opening;
a plurality of wires within the opening;
a power supply electrically connected to each wire of the plurality of wires via a respective inductor among a plurality of inductors; and
an electrical switch that creates a current change, the current change creating an electric potential spike across the inductor, the electric potential spike across the inductor initiating an arc discharge between the conductive plate and one or more wires of the plurality of wires, the arc discharge forming a plasma that ejects cathode particles from the matrix thruster, wherein:
the matrix thruster further comprises a plurality of electrical switches, each electrical switch of the plurality of electrical switches initiating a respective arc discharge between a respective one of the plurality of wires and the conductive plate.

8. A matrix thruster, comprising:
a conductive plate with an opening;
a plurality of wires within the opening;
a power supply electrically connected to the conductive plate or each wire of the plurality of wires via an inductor;
an electrical switch that creates a current change, the current change creating an electric potential spike across the inductor, the electric potential spike across the inductor initiating an arc discharge between the conductive plate and one or more wires of the plurality of wires, the arc discharge forming a plasma that ejects cathode particles from the matrix thruster;
a plurality of capacitors that each store a voltage generated by the power supply, the electrical switch, and the inductor;
a plurality of anode switches that each electrically connect a respective one of the plurality of wires in series with a respective one of the plurality of capacitors.

9. The matrix thruster of claim 8, wherein each anode switch of the plurality of anode switches initiates the arc discharge between the respective one of the plurality of wires and the conductive plate.

10. A method of generating thrust by a matrix thruster having a conductive plate with an opening, a plurality of wires within the opening, a power supply electrically connected to the conductive plate or each wire of the plurality of wires via an inductor, and an electrical switch, the method comprising:
operating the electrical switch to create a current change;
creating an electric potential spike, by the current change, across the inductor;
initiating an arc discharge, by the electric potential spike across the inductor the conductive plate and one or more wires of the plurality of wires;
forming a plasma, by the arc discharge, and ejecting cathode particles from the matrix thruster; and
applying carbon paint to the conductive plate, wherein the carbon paint and the cathode particles facilitate an electrical breakdown that promotes plasma formation at the cathode.

11. The method of 10, wherein the cathode particles form an inter-electrode film that facilitates additional plasma formation.

12. The method of 10, wherein the plurality of wires are arranged proximate each other such that the arc discharge between the conductive plate and a first wire of the plurality of wires generates an inter-electrode film that facilitates plasma formation at a second wire of the plurality of wires.

13. The method of claim 12, wherein the plurality of wires comprises four wires.

14. The method of claim 10, further comprising:
outputting signals to the electrical switch, by a microcontroller, to control the matrix thruster.

15. A method of generating thrust by a matrix thruster having a conductive plate with an opening, a plurality of wires within the opening, a power supply electrically connected to the conductive plate or each wire of the plurality of wires via an inductor, and an electrical switch, the method comprising:

operating the electrical switch to create a current change;
creating an electric potential spike, by the current change, across the inductor;
initiating an arc discharge, by the electric potential spike across the inductor the conductive plate and one or more wires of the plurality of wires;
forming a plasma, by the arc discharge, and ejecting cathode particles from the matrix thruster wherein:
the conductive plate is electrically connected to the power supply via the inductor;
the electrical switch initiates the discharge between a first wire of the plurality of wires and the conductive plate; and
the arc discharge between the first wire of the plurality of wires and the conductive plate initiates another arc discharge between a second wire of the plurality of wires and the conductive plate.

16. A method of generating thrust by a matrix thruster having a conductive plate with an opening, a plurality of wires within the opening, a power supply electrically connected to each wire of the plurality of wires via a respective inductor among a plurality of inductors, and an electrical switch, the method comprising:
operating the electrical switch to create a current change;
creating an electric potential spike, by the current change, across the inductor;
initiating an arc discharge, by the electric potential spike across the inductor the conductive plate and one or more wires of the plurality of wires;
forming a plasma, by the arc discharge, and ejecting cathode particles from the matrix thruster wherein:
the matrix thruster further comprises a plurality of electrical switches, each electrical switch of the plurality of electrical switches initiating a respective arc discharge between a respective one of the plurality of wires and the conductive plate.

17. A method of generating thrust by a matrix thruster having a conductive plate with an opening, a plurality of wires within the opening, a power supply electrically connected to the conductive plate or each wire of the plurality of wires via an inductor, and an electrical switch, the method comprising:
operating the electrical switch to create a current change;
creating an electric potential spike, by the current change, across the inductor;
initiating an arc discharge, by the electric potential spike across the inductor the conductive plate and one or more wires of the plurality of wires;
forming a plasma, by the arc discharge, and ejecting cathode particles from the matrix thruster, wherein the matrix thruster comprises:
a plurality of capacitors that each store a voltage generated by the power supply, the electrical switch, and the inductor;
a plurality of anode switches that each electrically connect a respective one of the plurality of wires in series with a respective one of the plurality of capacitors.

18. The method of claim 17, wherein each anode switch of the plurality of anode switches initiates a respective arc discharge between the respective one of the plurality of wires and the conductive plate.

* * * * *